United States Patent [19]

Handel et al.

[11] Patent Number: 4,863,674
[45] Date of Patent: Sep. 5, 1989

[54] HAVING OPERATING ELEMENT CHARGING AND REMOVAL

[75] Inventors: Hubert Handel, Rimbach; Hermann Schmitt, Winnweiler; Josef Schoening, Hambruecken, all of Fed. Rep. of Germany

[73] Assignee: Hochtemperatur-Reaktorbau GmbH, Fed. Rep. of Germany

[21] Appl. No.: 230,881

[22] Filed: Aug. 11, 1988

[30] Foreign Application Priority Data

Aug. 11, 1987 [DE] Fed. Rep. of Germany ....... 3726637

[51] Int. Cl.$^4$ .................... G21C 19/00; G21D 1/02
[52] U.S. Cl. .................................... 376/265; 376/272
[58] Field of Search ............. 376/381, 265, 264, 260, 376/272

[56] References Cited

U.S. PATENT DOCUMENTS

| | | | |
|---|---|---|---|
| 3,192,123 | 6/1965 | Costes et al. | 376/338 |
| 4,545,954 | 10/1985 | Ullrich et al. | 376/381 |
| 4,695,423 | 9/1987 | Teuchert et al. | 376/265 |
| 4,701,298 | 10/1987 | Schoening et al. | 376/273 |
| 4,789,519 | 12/1988 | Schoening et al. | 376/381 |

FOREIGN PATENT DOCUMENTS

| | | |
|---|---|---|
| 57868 | 1/1982 | European Pat. Off. . |
| 3335451 | 9/1983 | Fed. Rep. of Germany . |
| 3518968 | 5/1985 | Fed. Rep. of Germany . |

*Primary Examiner*—Brooks H. Hunt
*Assistant Examiner*—Daniel Wasil
*Attorney, Agent, or Firm*—Robert J. Koch

[57] ABSTRACT

A nuclear reactor installation with a simple configuration includes a transport container which may be placed on the cover of the cavity. The transport container bottom overlaps the cover access opening. A vertical displaceable pebble conveyor line extends from the pebble pile surface to the transport container interior. A blower is located between the transport container and the reactor. The blower suction line is connected to the transport container interior and the blower pressure line leads into the reactor vessel.

20 Claims, 5 Drawing Sheets

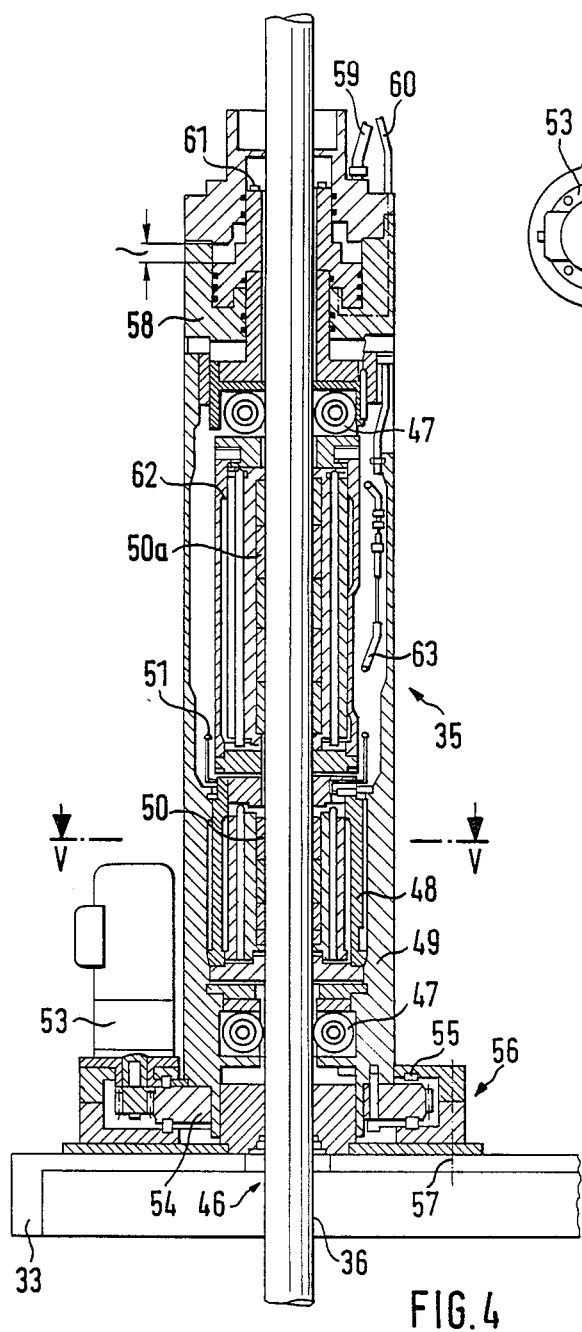
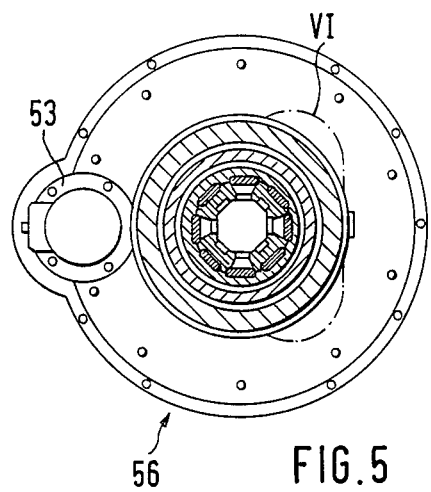
FIG.5
FIG.4
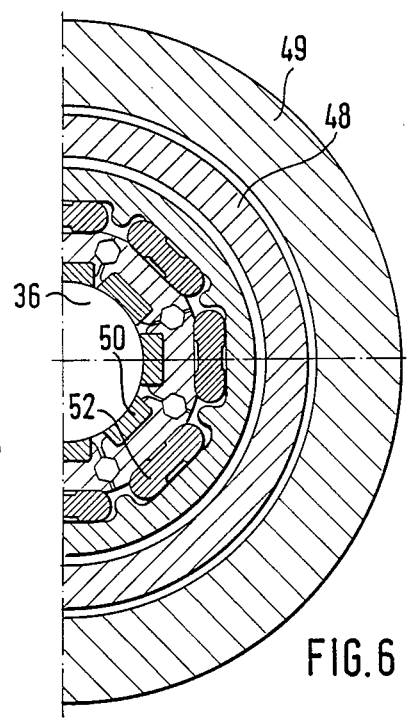
FIG.6

HAVING OPERATING ELEMENT CHARGING AND REMOVAL

BACKGROUND OF THE INVENTION

1. Field of the Invention

The invention relates to a low capacity gas cooled nuclear reactor installation and particularly an installation with a stationarily spherical fuel element pile located in a reactor vessel. The reactor vessel is housed in a cavity. The reactor vessel exhibits an access opening. The building overlapping at least the cavity cover comprises means for manipulating the operating elements.

2. Description of the Related Technology

DE-OS 35 18 968, the disclosure of which is expressly incorporated herein, shows a reactor installation with a stationary lifting device. Following completion of a power operation period of several years, the cavity is opened and the core vessel removed together with the operating elements contained therein. A shielding bell large enough to receive the entire core vessel is provided in the building and located over the cavity. The shielding bell must be large and heavy if it is part of a transport container. If the operating elements are reloaded from the shielding bell into a transport container additional effort, questionable from a safety standpoint, is required.

SUMMARY OF THE INVENTION

An object of the invention is to simplify and enable improved radiation safety during manipulation of operating elements in a reactor installation.

This object is attained according to the invention by setting a transport container on a cavity cover where the transport container bottom overlaps the cover access opening. A vertically displaceable pebble conveyor line extends from the pebble pile surface through the bottom of the transport container and into the transport container. A blower is located between the transport container and the reactor vessel. The suction line of the blower is connected to the inside of the transport container and its pressure line leads into the reactor core.

The constantly circulating gas flow entrains the spherical operating elements into the transport container. The vertically displaceable pebble conveyor line is arranged to insure that its projecting end always remains in the immediate vicinity of the pebble pile surface.

The frontal side of the pebble conveyor line facing the pile has a contour differing from the horizontal and may be rotated around its axle to facilitate seizing and entrainment of the spherical operating elements by gas flow.

Advantageously, a favorable pebble transport is achieved by utilizing a corrugated tube with internal longitudinal ribs as the pebble conveyor line.

A guide tube resembling a walking stick extends from the bottom of the transport container approximately vertically into the inner space, so that the guide tube extends to the vicinity of the cover of the transport container in order to fully and easily load the transport container directly under its cover. The pebble is displaceably guided in the guide tube.

The guide tube serves to guide the pebble conveyor line and the pebbles, in order to load the transport container from the top.

The bottom of the transport container is traversed by a bore extending concentrically relative to the guide tube resembling a walking stick and a further bore receiving the blower suction line. The passages may be closed by ball valves and with a shielding stopper located on a closure cover following completion of the charging process.

According to a preferred embodiment the transport container exhibits an intermediate bottom in the form of a filter to support the operating elements and the suction line terminates under the intermediate bottom in order to prevent the suction line from suctioning dust particles from the transport container.

A displaceable frame with a hydraulic lifting device is preferably arranged in the housing. The frame moves the transport container between its place of application above the access opening and a transport vehicle located outside the housing. This eliminates the need for a stationary lifting tool and a correspondingly more extensive housing configuration.

A rotating and advance unit is associated with the conveyor line for the vertical and rotating motion of the pebble conveyor line. The unit is preferably fastened to a closure slide housing assigned to the reactor vessel.

Advantageous configurations of the rotating and advance unit are set forth below.

The frontal side of the pebble conveyor line, facing the pile, may advantageously be angled and non-horizontal and may be rotated around its axle. The pebble conveyor line may be a corrugated tube with longitudinal inner ribs. A guide tube resembling a walking stick in shape extends from the bottom of the transport container approximately vertically into the inner space of the container. The guide tube extends into the vicinity of the cover of the transport container and the pebble conveyor line is arranged in the guide tube in a vertically displaceable manner. The transport container bottom is traversed by a bore extending concentrically with the guide tube and may exhibit an inline ball valve. A bore may also be provided in the transport container bottom for passage of the suction line, and the bore may be closed off by a ball valve. A closure cover may be mounted under the container bottom. The cover carries shielding stoppers which extend into the bottom bores. The bore ball valves may be accessible by inserts releasably located in the bottom. The transport container may advantageously comprise an intermediate bottom in the form of a filter for supporting the operating elements and the suction line terminates under the intermediate bottom.

A movable frame with a hydraulic lifting device may advantageously be provided in the building. The movable frame carries the transport container between its operational position above the access opening and a transport vehicle located outside the building.

The rotating and advance unit is advantageously associated between the transport container and the reactor vessel with the pebble conveyor line. The rotating and advance unit may be mounted on the housing of a closure slide associated with the reactor vessel. A covering sleeve may extend between the rotating and advance unit and the transport container bottom. The covering sleeve may concentrically surround the pebble conveyor line while leaving a certain clearance. The rotating and advance unit concentrically surrounds the pebble conveyor and is equipped with a pneumatically controlled stepping piston movable in the axial direction with or without the pebble conveyor line. The rotating and advance unit also includes a holder device and a drive rotatable with the pebble conveyor line. The stepping piston and the holding device may be equipped with a plurality of clamping jaws on their surface areas facing the pebble conveyor line. The clamping jaws may be applied to the pebble conveyor line by pneumatically actuated setting elements. The holding device and the stepping piston are alternatingly frictionally connected to the pebble conveyor line.

A process for the replacement of the operating elements in a nuclear reactor installation according to the invention is characterized in that the primary loop is operated without pressure and the cooling gas is stored intermediately. The operating elements are conveyed by a circulating gas flow between the transport container and the reactor vessel into the transport container. The transport container is separated after it is filled with burned operating elements from the circulating gas flow. A container with new fuel elements is connected to the circulating gas flow. The operating elements arrive through the pebble conveyor line in the reactor vessel by their own gravity. A braking action is applied to the falling pebbles by adjustment of the blower output. The pebble conveyor line end facing the pebble pile is constantly maintained at the height of the surface of the pebble pile. The cooling gas is recirculated from its intermediate storage, into the primary loop and gas losses are equalized by a reservoir.

The advantages of such a process are to be found primarily in that the replacement of the operating elements may be carried out with the nuclear reactor not under pressure, no gas purification means are required and mobile devices are used which may be applied to multiple installations.

A nuclear reactor installation according to the invention and a process for the replacement of operating elements in such a nuclear reactor are described below by way of example and with reference to FIGS. 1 to 6.

BRIEF DESCRIPTION OF THE DRAWINGS

FIG. 2b shows a section on the line II—II of FIG. 2a.

FIG. 4 shows another enlarged partial area according to FIG. 2.

FIG. 5 shows a section along the line V—V of FIG. 4.

FIG. 6 shows a detail "VI" of FIG. 5.

DETAILED DESCRIPTION OF THE PREFERRED EMBODIMENT

Figure 1:
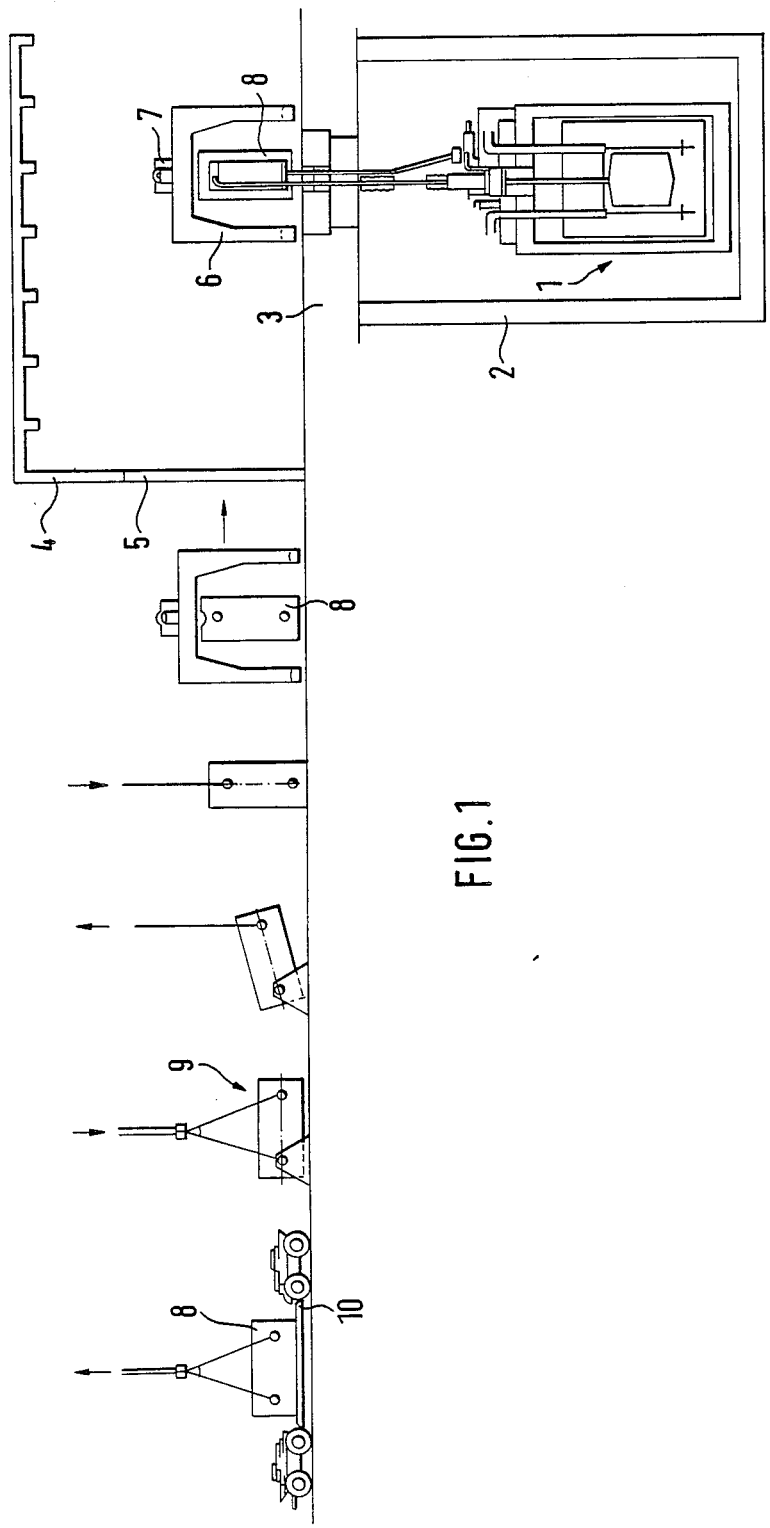
FIG. 1 shows schematically the operating replacement process.

FIG. 1 shows the schematic process of charging or unloading the reactor vessel 1 with spherical operating elements. A cavity housing or container 2 surrounds the reactor vessel 1. The cover 3 of the cavity is bounded or enclosed by an external housing 4 which is equipped with a gate 5. A travelling frame 6 may be moved into or out of the building through gate 5. The travelling frame 6 uses a hydraulic lifting device 7 to carry transport container 8, thereby eliminating the need for a stationary lifting device in the building 4. The transport container is taken over by a mobile crane and placed on a transport carriage 10 after it has attained its horizontal position 9.

Figure 2:
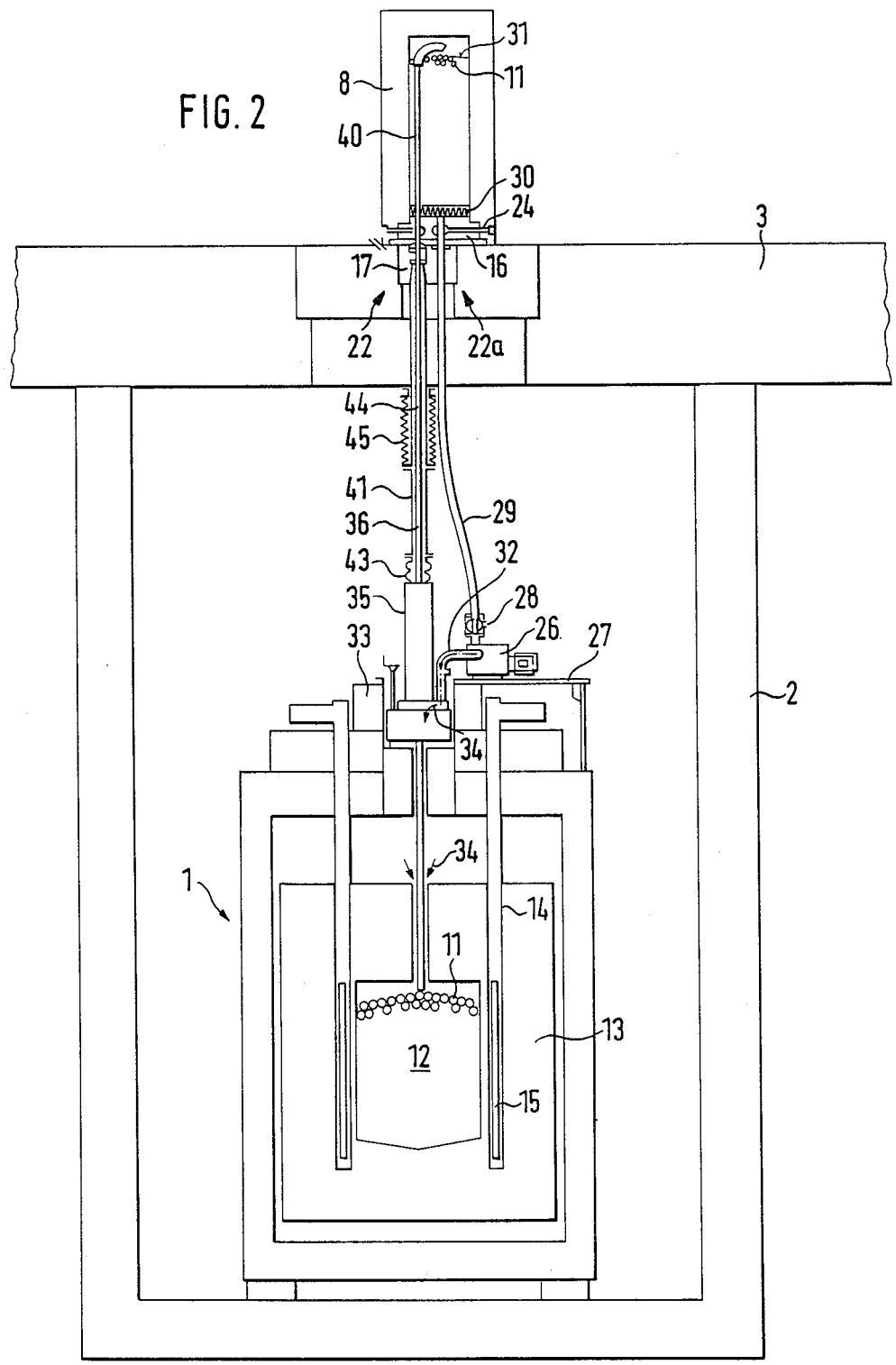
FIG. 2 shows an enlarged partial area of a nuclear reactor installation.
Figure 2B:
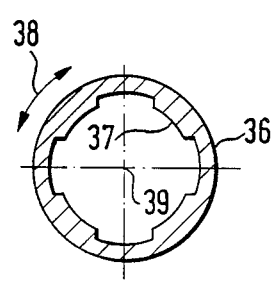
Figure 2A:
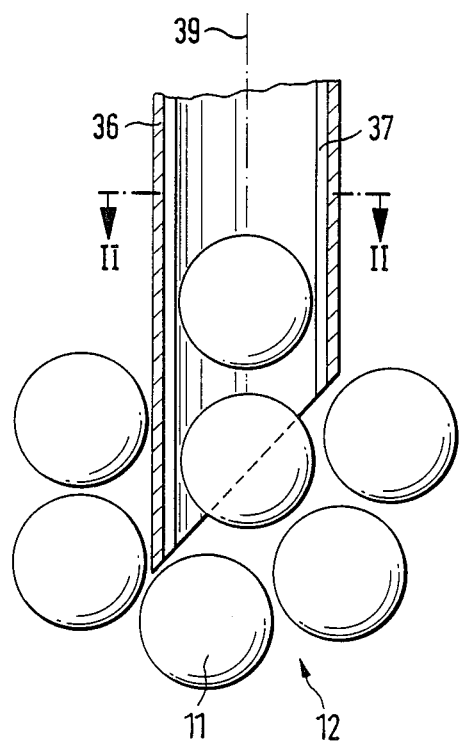
FIG. 2a shows a partial area of the pebble pile.
Figure 3:
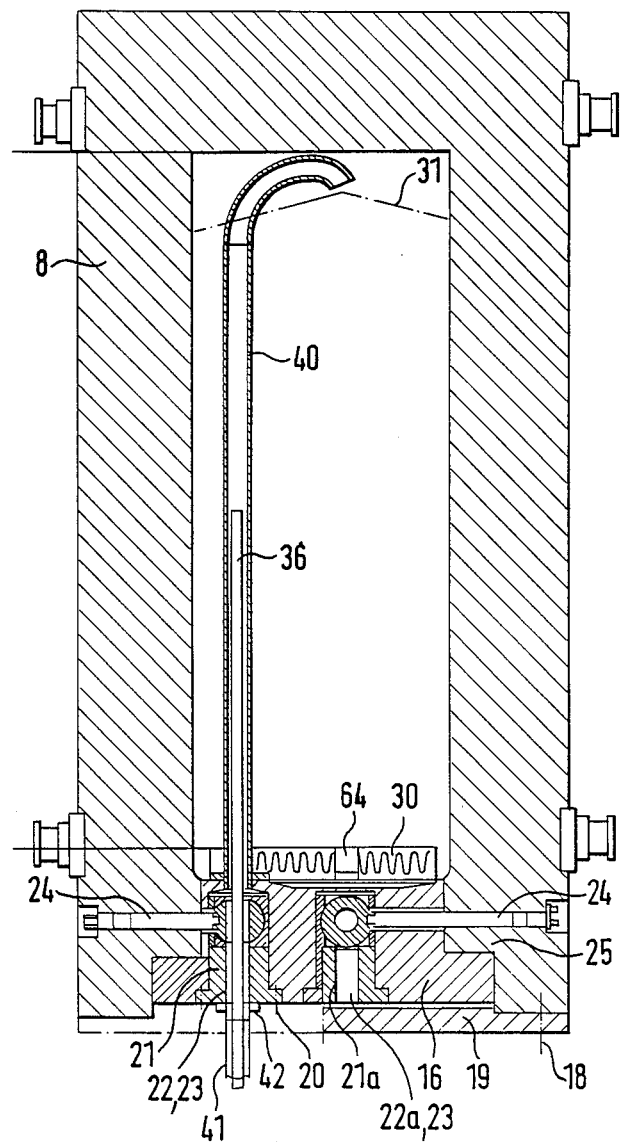
FIG. 3 shows an enlarged partial area of FIG. 2.

FIG. 2 shows the area of the nuclear reactor installation taking part in the manipulation of the spherical operating elements 11. A pile 12 of spherical operating elements 11 is surrounded by a reflector 13. The operating elements may be fuel elements. The reflector exhibits channels 14 to receive the absorber rods 15. The operational lifetime of the stationary pile is in the range of several years. At the conclusion of the operating period, all of the operating elements are removed from the reactor vessel 1 and replaced by new ones. The transport container 8 is set onto the cover 3 of the cavity so that the transport container bottom 16 overlaps the cover access opening 17. A closure cover 19 (FIG. 3) fastened by screws 18 to the transport container is removed to expose bores 22, 22a prior to transport container placement. The bores 22, 22a pass through 21, 21a which are secured to the transport container bottom 16 by screws 20. The shielding cover 19 carries two shielding stoppers 23 to insure the shielding effect. The shielding stoppers 23 project into the bores 22, 22a when the closure cover is in place. A ball valve 24 actuable from the side of the transport container is arranged above each of the inserts and fastened by screws 25. The ball valves 24 are arranged in the bottom 16 and enable closure of the bottom passages leading above the bores 22, 22a. The ball valves 24 may be actuated by a rotational movement. A variable gas flow blower 26 rests on a supporting frame 27 connected the reactor vessel 1. A suction line 29 equipped with a closure fitting 28 leads to the bore 22a of the bottom 16 and suctions gas from the transport container 8 when the ball valve 24 is open. The bottom passage containing the suction line terminates below a filter in the form of an intermediate bottom 30 in order to prevent suctioning of dust particles from the transport container. The intermediate bottom is stable enough to support a pebble filling extending to the line 31. A stopper 64 located in the intermediate bottom 30 is opened during a subsequent unloading of the transport container for removal of burned operating elements. The pressure line 32 of the blower 26 conducts the gas suctioned in through a closure slide 33 associated with the reactor container in the direction of the arrow 34 into the reactor vessel pebble pile 12. A pebble conveyor line 36 is always maintained with its end facing the pile 12 at the height of the surface of the pile and rotated in a pendulum motion around its axis by a rotating and advance unit 35 mounted on the closure slide 33. As seen from FIGS. 2a and 2b, the pebble conveyor line 36 may be a corrugated pipe with internal longitudinal ribs 37. The operating elements 11 to be conveyed are better guided and more rapidly transported in a corrugated pipe than in a smooth pipe. The frontal side of the pebble conveyor line 36 facing the pile 12 is bevelled off and thus exhibits a non-horizontal outline. With a pendulum or reciprocating rotation of the pebble conveyor line 36 in the direction of the arrow 38 around its axle 39 the operating elements 11 enter the bevelled opening of the pebble conveyor line 36 easier. This increases the conveying capacity and blockage of the opening is avoided. The pebble conveyor line 36 extends concentrically through the rotating and advance line 35 and reaches with the ball valve 24 to open a guide tube resembling a walking stick. The guide tube 40 is fastened to the inside of the transport unit bottom 16 and extends approximately vertically upwards and reaches with its bent end the vicinity of the cover of the transport container 8. A covering sleeve 41 concentrically encompasses the pebble conveyor line 36 arranged between the rotating and advance unit 35 and the bottom 16. The sleeve 41 is fastened to the lower side of the transport container bottom by screws 42. The sleeve 41 is connected to the rotating and advance unit 35 by the insertion of folding bellows 43 in a dust-tight manner. The sleeve is assembled in the area of separation points 44 to enable mounting the pebble conveyor line 30. A spring 45 maintains the cover sleeve 41 to stabilize the connection to the folding bellows 43.

FIGS. 4 to 6 show the configuration of the rotating and advance unit 35. The pebble conveyor line 36 extends through the center passage 46 and is supported slidingly over the rolls 47. A holding device 48 is rigidly connected to a housing 49 of the rotating and advance unit. Clamping jaws 50 may be pressured against the pebble conveyor line 36 by pressure medium passages 51 acting on the setting elements 52. In this holding position the pebble conveyor line 36 may be rotated by the rotating drive 53 engaging a toothed wheel 54 connected to the housing 49. The toothed wheel 54 is displaceably supported by groove bearings 55 relative to the support elements 56. The support elements 56 are in turn fastened with screws to the closure slide 33. A stepping piston 58, which by pressure medium connnections 59, 60 carries out a stroke of approximately 30 mm, is connected by the screws 61 to a transport device 62. The transport device is equipped through pressure medium line 63 with clamping jaws 50a similar to those of the holding device 48. Following the release by the holding device 48 of the pebble conveyor line 36, the transport device 62 may displace the latter always by a stroke of the stepping piston 58 in the vertical direction.

The rotating and advancing unit 35 utilizes the stepping piston 58 in cooperation with the transport device 62 clamping jaws 50a and the holding device 48 clamping jaws 50, to axially displace the pebble conveyor line 36. To insert the pebble conveyor line the stepping piston 58 is raised. Clamping jaws 50a are then activated and clamping jaws 50 are deactivated whereupon the stepping piston 58 is advanced. Clamping jaws 50a are then deactivated and jaws 50 are activated. To further advance the pebble conveyor line the above is repeated; to withdraw the pebble conveyor line the above is reversed. The clamping jaws 50, 50a and the stepping piston 58 are operated by the introduction of pressure medium through the various pressure medium connections and lines in a fashion similar to pneumatic or hydraulic operating devices.

If the pebble pile 12 is to be removed from the reactor vessel 1, a transport container 8 is brought into a loading position on the cover 3 of the cavity 2, following the removal of the closure cover 19 and the opening of the ball valves 24. The nuclear reactor installation is rendered pressureless, the cooling gas interposed and returned to the primary cooling loop after reloading. After the blower has been connected on the suction side to the transport container 8 and on the compression side to the reactor vessel 1, the constantly circulating gas flow moves the pebbles into the transport container. The pebble conveyor line 36 is maintained constantly at the height of the surface of the pile 12 and optionally rotated in a reciprocating fashion or the manner of a pendulum by the rotating and advance unit 35. The same apparatus is used in the loading of new operating elements. However, the container has thinner walls. Furthermore, it has no guide tube, so that the operating elements are free to drop into the reactor vessel 1. The gas flow with a reduced velocity serves as a brake for the pebbles.

I claim:

1. A low capacity, gas cooled nuclear reactor installation comprising:
    a pile of spherical operating elements stationary within a reactor vessel arranged in a cavity;
    a cover over said cavity with an access opening disposed in said cover;
    a building constructed over at least said cover;
    an operating element manipulation device including a transport container positioned on said cover wherein a transport container bottom overlaps said access opening;
    a vertically displaceable pebble conveyor line extending from an upper surface of said pile into said transport container;
    a blower located between said reactor vessel and said transport container wherein a suction side of said blower is connected to an interior area of said transport container and a pressure side is connected to said reactor vessel.

2. A reactor installation according to claim 1, wherein a frontal side of said pebble conveyor line facing said pile exhibits a non-horizontal outline and is arranged to be rotated.

3. A reactor installation according to claim 2, wherein said pebble conveyor line is a corrugated tube exhibiting longitudinal inner ribs.

4. A reactor according to claim 1, further comprising a guide tube resembling a walking stick extends approximately vertically from said transport container bottom into an inner area of said transport container and wherein said pebble conveyor line is guided in said guide tube in a vertically displaceable manner.

5. A reactor installation according to claim 4 further comprising:
    a bore traversing said transport container bottom extending concentrically with the guide tube;
    a ball valve arranged to close said bore.

6. A reactor installation according to claim 1, further comprising:
    a bore arranged in said transport container bottom wherein said suction line passes through said bore; and
    a ball valve arranged to close said bore.

7. A reactor installation according to claim 6, further comprising a shielding stopper extending into said bore and carried on a closure cover mounted under said transport container bottom.

8. A reactor installation according to claim 6, further comprising releasable inserts in said transport container bottom arranged to allow access to said ball valve.

9. A reactor installation according to claim 1, wherein said transport container further comprises:
    an intermediate bottom adjacent to said transport container bottom, wherein said intermediate bottom is a filter and configured to support the operating elemetns, and wherein said suction line terminates under said intermediate bottom.

10. A reactor installation according to claim 1, further comprising:
    a movable frame exhibiting a hydraulic lifting device adapted to move said transport container between an operational position above the access opening and a transport vehicle located outside the building.

11. A reactor installation according to claim 1 further comprising:
   a rotating and advance unit associated with said pebble conveyor line located between said transport container and said reactor vessel.

12. A reactor installation according to claim 11, wherein said rotating and advance unit is mounted on a housing of a closure slide associated with the reactor vessel.

13. A reactor installation according to claim 11 further comprising a covering sleeve concentrically surrounding said pebble conveyor line extending between said rotating and advance unit and said transport container bottom wherein said covering sleeve defines a clearance space around said pebble conveyor line.

14. A reactor installation according to claim 11, wherein said rotating and advance unit concentrically surrounds pebble conveyor line and comprises a pneumatically controlled stepping piston axially movable independently of said pebble conveyor line, a holder device adjacent to said pebble conveyor line and a drive rotatable with said pebble conveyor line.

15. A reactor installation according to claim 14, wherein said stepping piston and said holding device comprise a plurality of clamping jaws with pneumatically actuated setting elements positioned on surface areas of said holding device and stepping piston facing said pebble conveyor line.

16. A reactor installation according to claim 1, wherein said pebble conveyor line is a corrugated tube exhibiting longitudinal inner ribs.

17. A reactor installation according to claim 1 further comprising:
   a bore traversing said transport container bottom extending concentrically with the guide tube;
   a ball valve arranged to close said bore.

18. A reactor installation according to claim 5, further comprising a shielding stopper extending into said bore and carried on a closure cover mounted under said transport container bottom.

19. A reactor installation according to claim 5, further comprising releasable inserts in said transport container bottom arranged to allow access to said ball valve.

20. A reactor installation according to claim 16, further comprising:
   a rotating and advance unit associated with said pebble conveyor line located between said transport container and said reactor vessel.

* * * * *

UNITED STATES PATENT AND TRADEMARK OFFICE
CERTIFICATE OF CORRECTION

PATENT NO. : 4,863,674
DATED : September 5, 1989
INVENTOR(S) : Hubert Handel, Hermann Schmitt, Josef Schoening It is certified that error appears in the above-identified patent and that said Letters Patent is hereby corrected as shown below:

TITLE OF INVENTION: Nuclear Reactor Installation Having Operating Element Charging and Removal Signed and Sealed this Twenty-third Day of October, 1990

Attest:

HARRY F. MANBECK, JR.

*Attesting Officer*     *Commissioner of Patents and Trademarks*